United States Patent Office 3,847,877
Patented Nov. 12, 1974

---

3,847,877
TRANSPARENT, THERMOPLASTICALLY FORMABLE COPOLYAMIDES FROM BIS(4 - AMINO CYCLOHEXYL)METHANE-AROMATIC DICARBOXYLIC ACID ε-CAPROLACTAM
Werner Nielinger, Hans Rudolph, Rolf Dhein, and Kurt Schneider, Krefeld, Germany, assignors to Bayer Aktiengesellschaft, Leverkusen, Germany
No Drawing. Filed Dec. 1, 1972, Ser. No. 311,371
Claims priority, application Germany, Dec. 2, 1971, P 21 59 803.8
Int. Cl. C08g 20/12, 20/20
U.S. Cl. 260—78 L                   10 Claims

ABSTRACT OF THE DISCLOSURE

Transparent, thermoplastically formable copolyamides, obtained by polycondensation of bis-(4-amino cyclohexyl)-methane, at least one aromatic dicarboxylic acid and ε-caprolactam, with a relative solution viscosity of at least 1.5

---

This invention relates to transparent, thermoplastically formable copolyamides and to a process for their production from bis-(4-amino cyclohexyl)-methane, isophthalic acid and/or terephthalic acid in conjunction with ε-caprolactam.

Polyamides of bis-(4 - amino cyclohexyl)-methane and aromatic or aliphatic dicarboxylic acids have already been described. Unfortunately, the polyamides of bis-(4-amino cyclohexyl) - methane and aromatic dicarboxylic acids, such as isophthalic acid (U.S. Pat. No. 2,696,482) or terephthalic acid (U.S. Pat. No. 2,516,585), can hardly be processed by moulding because of their high melt viscosity, whereas the lower-melting polyamides of bis-(4-amino cyclohexyl)-methane and aliphatic dicarboxylic acids such as adipic acid (U.S. Pat. No. 2,585,163) are not transparent or show a tendency towards subsequent crystallisation and hence towards hazing.

Copolyamides of bis - (4-amino cyclohexyl)-methane, dicarboxylic acids and further polyamide-forming components, such as polyamides of bis-(4 - amino cyclohexyl)-methane, adipic acid, hexamethylene diamine and ε-caprolactam, are also transparent, but are extremely sensitive to solvent, form clouded spheroliths and show considerable cold flow. The transparent copolyamides described in DOS No. 1,933,395, prepared from mixtures of bis-(4-amino cyclohexyl) - methane, hexamethylene diamine, isophthalic acid and terephthalic acid in particular ratios, also have extremely low softening points and hence very poor dimensional stability to heat.

Although polyamides of bis-(4 - amino cyclohexyl)-methane and adipic acid do not give transparent products, the polyamides based on bis-(4-amino cyclohexyl)-propane and adipic acid described in DOS No. 1,595,354 show a lower tendency towards crystallisation. However, the high softening points of these polyamides complicate their thermoplastic processing to a very considerable extent. This applies not only to the polyamides produced from bis-(4-amino cyclohexyl)-propane and aliphatic dicarboxylic acids, but also to the polyamides obtained from bis-(4-amino cyclohexyl)-methane and aromatic dicarboxylic acids. Although the processibility of the mentioned polyamides is improved by the addition of other polyamide-forming starting materials, such as ε-caprolactam, even small additions lead to soluble polyamides and these copolyamides are thus extremely sensitive to solvents.

Surprisingly, it has now been found that copolyamides of bis-(4-amino cyclohexyl)-methane, isophthalic acid and/or terephthalic acid and ε-caprolactam do not have any of the disadvantages referred to above. The products can be shaped by thermoplastic processing into transparent articles of high stability to heat and high resistance to organic solvents.

Accordingly the invention relates to transparent, thermoplastically formable copolyamides, obtained by polycondensation of bis-(4-amino cyclohexyl)-methane, at least one aromatic dicarboxylic acid and ε-caprolactam, with a relative solution viscosity of at least 1.5 consisting of (1) from 70 to 35% by weight of equimolar quantities of amino units (a) of the general formula

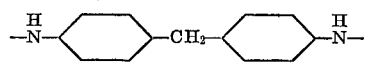

and of aromatic dicarboxylic acid units (b) of the general formula

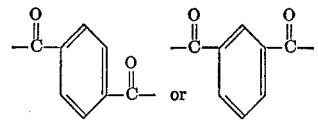

and
(2) from 30 to 65% by weight of lactam units (c) of the general formula

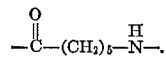

Particularly preferred copolyamides according to the invention are copolyamides consisting of from 60 to 70% by weight of equimolar quantities of units (a) and of isophthalic acid units
and from 30 to 40% by weight of units (c).

These copolyamides being distinguished in particular by their high rigidity besides their transparency. Also preferred copolyamides are copolyamides consisting of from 45 to 55% by weight of equivalent quantities of units (a) and of a mixture of dicarboxylic acid units (b) consisting of
from 60 to 80% by weight of terephthalic acid units and from 20 to 40% by weight of isophthalic acid units, and
from 45 to 55% by weight of units (c), these polyamides being distinguished by their toughness besides their transparency. Copolyamides consisting of from 35 to 50% by weight of equivalent quantities of units (a) and of terephthalic acid units and
from 50 to 65% by weight of units (c), are also preferred.

The polyamides according to the invention are distinguished by their outstanding transparency, which remains intact in the event of prolonged storage of the shaped articles in hot water, during heating in air or after melting and gradually cooling. The polyamides have a second-order transition temperature, measured by differential thermal analysis of at least 100° C. so that, by virtue of their high dimensional stability to heat, the shaped articles can be used at elevated temperatures without losing rigidity. The polyamides show high resistance to solvents.

The polyamides can be produced by melt polycondensation known for the polycondensation of diamines with dicarboxylic acids.

In many cases, substantially equivalent quantities of bis-(4-amino cyclohexyl)-methane and dicarboxylic acid together with ε-caprolactam are precondensed, preferably in the presenece of water, at temperatures of up to 200° C. under the natural vapour pressure of the water. Following the release of pressure, condensation is continued to completion at temperatures of up to 320° C.

It is particularly advantageous to use the diamine and dicarboxylic acid in the form of the salts formed therefrom.

However, it is also possible to use small excesses of diamine to produce polyamides of particularly high molecular weight.

In some cases, it is advisable to use a modified method of production wherein bis-(4-amino cyclohexyl)-methane is dissolved in molten ε-caprolactam and condensation is carried out following the subsequent addition of the dicarboxylic acid. This procedure is particularly preferred in cases where terephthalic acid is used.

Instead of the dicarboxylic acids themselves, it is also possible to use for condensation derivatives of these, such as lower alkyl or aryl esters.

Methyl and ethyl esters are particularly suitable lower alkyl esters for the condensation reaction, whereas the esters of aromatic hydroxy compounds, such as phenyl ester, may be used as the diaryl esters.

Bis-(4-amino cyclohexyl)-methane is an isomer mixture comprising predominantly trans-trans-, cis-trans- and, to a limited extent, cis-cis-isomers. The isomer mixture, formed during hydrogenation of bis-(4-amino phenyl)-methane, with a melting point in excess of 30° C. is preferably used for the condensation reaction.

The transparent polyamides can be processed by conventional methods of injection moulding or extrusion. They can be used inter alia for the production of shaped articles, films and fibres.

The polyamides can contain aids and additives such as fillers, molecular weight regulators, light and heat stabilisers or lubricants and mould-release agents which can be added before, during or after condensation.

EXAMPLE 1

Preparation of the salt bis-(4-amino cyclohexyl)-methane and isophthalic acid 664.5 g. of isophthalic acid are suspended in 4.42 litres of 85% ethanol. A solution of 841.5 g. of bis-(4-amino cyclohexyl)-methane (m.p. 39–42° C.) in 2.08 litres of ethanol is added dropwise with stirring to this suspension at a temperature of 80° C. over a period of 2 hours in a nitrogen atmosphere. Addition of the diamine initially results in the formation of a clear solution from which the salt crystallises out as addition of the diamine progresses. The reaction mixture is stirred at 70° C. for 1 hour. After cooling to room temperature, the crystals are filtered off under suction and washed with ethanol.

Yield: 1461 g., corresponding to 97% of the theoretical. Melting point: 262–264° C.

8210 g. of the salt obtained, 4000 g. (35% by weight, based on the polyamide) of ε-caprolactam and 3 litres of water are precondensed in a pressure vessel at 100° C. for 1 hour under normal pressure. Thereafter the reaction mixture is heated to 220° C. under the natural vapour pressure of the water. The pressure is carefully released and, at the same time, the temperature further increased. Condensation is completed after a further 8 hours at a temperature of 270° C. The polyamide is spun into water in the form of a bristle-like filament and chopped up. After drying, it can be injection-coulded into transparent mouldings without any need for previous extraction.

The product has a relative solution viscosity of 2.60 as measured on a 1% in m-cresol at 25° C. in an Ubbelohde viscosimeter. The product softens at around 205° C. The polyamide has a glass temperature of 153° C. Even shaped articles of above 5 cm. wall thickness obtained from these polyamides are transparent. Their transparency remains both on exposure to boiling water and after melting and gradually cooling the polyamide is insoluble in methanol, shaped articles undergoing only very slight swelling on prolonged storage in methanol.

EXAMPLE 2

21.03 g. of bis-(4-amino cyclohexyl)-methane, 16.61 g. of isophthalic acid and 18.30 g. (35%, based on the polyamide) of ε-caprolactam are slowly heated to 270° C. in a nitrogen atmosphere. A salt-like, solid reaction product is formed, melting again at a bath temperature of around 240° C. The clear melt is then condensed with stirring at 270° C. for 8 hours. A transparent polyamide with a softening point of around 200° C. and a relative solution viscosity of 2.8 is obtained. The polyamide is insoluble in methanol.

EXAMPLE 3

21.03 g. (0.1 mol) of bis-(4-amino cyclohexyl)-methane 12.46 g. (0.075 mol) of terephthalic acid and 4.152 g. (0.025 mol) of isophthalic acid are heated with 34.1 g. (50%, based on the polyamide) of ε-caprolactam to 270° C. over a period of 60 minutes with stirring in a nitrogen atmosphere. Condensation is completed after a further 7 hours at 270° C. A transparent polyamide with a relative solution viscosity of 3.09 is obtained. It softens at 188° C. The polyamide has a second-order transition temperature, according to the DTA, of 125° C. After storage for 4 days in boiling water, the polyamide shows a water absorption of 9.8% without any loss of transparency. The polyamide is undissolved after storage in methanol for 50 hours.

EXAMPLE 4

2306 g. of terephthalic acid and 2945 g. of bis-(4-amino cyclohexyl)-methane are introduced into 7147 g. of molten ε-caprolactam at 80° C. The reaction mixture is heated during 6 hours with stirring to 270° C. in a nitrogen atmosphere and condensed at this temperature for a further 8 hours. Thereafter the polyamide is spun into water in the form of a bristle-like filament, chopped up and dried. The polyamide can be injection-moulded into transparent mouldings without any need for previous extraction. The product has a relative solution viscosity of 2.7 (c=1.0 g./100 ml. of m-cresol). The polyamide has second-order transition temperature of 100° C. The polyamide does not dissolve on storage in methanol for 50 hours.

What is claimed is:

1. Transparent, organic solvent resistant thermoplastically formable copolyamides, obtained by polycondensation of bis-(4-amino cyclohexyl)-methane, at least one aromatic dicarboxylic acid and ε-caprolactam, with a relative solution viscosity of at least 1:5 as measured in a 1% m-cresol solution at 25° C. consisting of:

(1) from 70 to 35% by weight of equimolar quantities of amino units (a) of the general formula

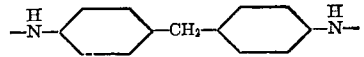

and of aromatic dicarboxylic acid units (b) of the general formula

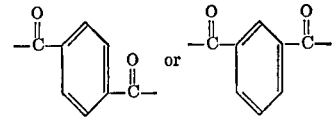

and (2) from 30 to 65% by weight of lactam units (c) of the general formula

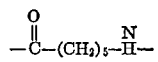

2. Copolyamides as claimed in claim 1 consisting of:
(1) from 70 to 60% by weight of equivalent quantities of units (a) and isophthalic acid units; and
(2) from 30 to 40% by weight of units (c).

3. Copolyamides as claimed in claim 1 consisting of:
(1) from 50 to 35% by weight of equivalent quantities of units (a) and terephthalic acid units; and
(2) from 50 to 65% by weight of units (c).

4. Copolyamides as claimed in claim 1 consisting of:
(1) from 55 to 45% by weight of equivalent quantities of units (a) and a mixture of dicarboxylic acid units (b) consisting of:
from 60 to 80% by weight of terephthalic acid units and from 20 to 40% by weight of isophthalic acid units, and
(2) from 45 to 55% by weight of units (c).

5. Copolyamides as claimed in claim 1 which are insoluble in methanol.

6. A process for the preparation of a copolyamide as claimed in claim 1, in which bis-(4-amino cyclohexyl)-methane and a substantially equivalent quantity of isophthalic acid and/or terephthalic acid are condensed in the presence of ε-caprolactam.

7. A process as claimed in claim 6, in which the condensation takes place initially in the presence of water at a temperature of up to 200° C. and is then completed at a temperature of up to 320° C.

8. A process as claimed in claim 6, in which the bis-(4-amino cyclohexyl)-methane and the isophthalic acid and/or terephthalic acid are provided in the form of salts formed therefrom.

9. A modification of the process claimed in any of claim 6 in which the bis-(4-amino cyclohexyl)-methane is dissolved in molten ε-caprolactam and the condensation is carried out by adding the isophthalic acid and/or terephthalic acid.

10. A shaped article film or fiber consisting essentially of a copolyamide as claimed in claim 1.

References Cited
UNITED STATES PATENTS

| | | | |
|---|---|---|---|
| 2,516,585 | 7/1950 | Pease | 260—78 R |
| 2,696,482 | 12/1954 | Pease | 260—78 R |
| 3,563,959 | 2/1971 | Schade et al. | 260—78 L |
| 3,598,789 | 8/1971 | Tippetts | 260—78 L |
| 3,703,595 | 11/1972 | Falkstein et al. | 260—78 LXR |

LUCILLE M. PHYNES, Primary Examiner

U.S. Cl. X.R.
260—29.2 N